(12) United States Patent
Haas et al.

(10) Patent No.: US 9,193,328 B2
(45) Date of Patent: Nov. 24, 2015

(54) DEVICE FOR ANCHORING A BELT LOCK

(71) Applicant: TRW Automotive GmbH, Alfdorf (DE)

(72) Inventors: Peter Haas, Eschach (DE); Detlev Schmid, Schwäbisch Gmünd (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 14/370,787

(22) PCT Filed: Dec. 6, 2012

(86) PCT No.: PCT/EP2012/005025
§ 371 (c)(1),
(2) Date: Jul. 7, 2014

(87) PCT Pub. No.: WO2013/104386
PCT Pub. Date: Jul. 18, 2013

(65) Prior Publication Data
US 2014/0373313 A1 Dec. 25, 2014

(30) Foreign Application Priority Data
Jan. 9, 2012 (DE) .......................... 10 2012 000 202

(51) Int. Cl.
*B60R 22/18* (2006.01)

(52) U.S. Cl.
CPC .............. *B60R 22/18* (2013.01); *Y10T 24/318* (2015.01)

(58) Field of Classification Search
CPC ............ B60R 22/18; B60R 2022/1806; B60R 2022/1812; B60R 2022/1831; Y10T 24/318
USPC ..................... 280/801.1, 801.2; 297/481, 482
See application file for complete search history.

(56) References Cited

U.S. PATENT DOCUMENTS

| 3,437,349 A * | 4/1969 | Feles et al. .................... 297/482 |
| 4,103,933 A * | 8/1978 | Fisher et al. .................. 297/468 |
| 4,331,350 A * | 5/1982 | Frankila et al. ............ 280/801.1 |
| 4,966,393 A * | 10/1990 | Tokugawa .................. 280/801.1 |
| 5,860,706 A * | 1/1999 | Fausel ............................. 297/481 |
| 7,988,196 B2 * | 8/2011 | Wang .......................... 280/801.1 |
| 2006/0254033 A1 * | 11/2006 | Smith ............................... 24/633 |
| 2010/0257708 A1 * | 10/2010 | Ogawa et al. ................. 24/593.1 |
| 2011/0215558 A1 * | 9/2011 | Singer et al. ................... 280/733 |

FOREIGN PATENT DOCUMENTS

| DE | 20 2004 001 993 | 5/2004 |
| DE | 10 2009 010 781 | 9/2010 |
| GB | 2 402 370 | 12/2004 |

* cited by examiner

*Primary Examiner* — Paul N Dickson
*Assistant Examiner* — Darlene P Condra
(74) *Attorney, Agent, or Firm* — Tarolli, Sundheim, Covell & Tummino LLP

(57) ABSTRACT

A device for anchoring a belt buckle (10) comprises a fitting (12) including a first end portion (20) and a second end portion (22) as well as a central portion (18) provided between the two end portions (20, 22). The central portion (18) has an opening for fastening the fitting (12) in a way affixed to the vehicle by means of a screw (16). The device further comprises a connecting strap (14) connected on the one hand to the belt buckle (10) and on the other hand to the fitting (12). According to the invention, the connecting strap (14) extends along the first end portion (20) and the central portion (18) of the fitting (12) and is threaded via a loop (30) into an eyelet (24) of the second end portion (22).

10 Claims, 1 Drawing Sheet

DEVICE FOR ANCHORING A BELT LOCK

RELATED APPLICATIONS

This application corresponds to PCT/EP2012/005025, filed Dec. 6, 2012, which claims the benefit of German Application No. 10 2012 000 202.5, filed Jan. 9, 2012, the subject matter, of which are incorporated herein by reference in their entirety.

BACKGROUND OF THE INVENTION

The invention relates to a device for anchoring a belt buckle. The invention further relates to a device arrangement comprising at least two of said devices.

Belt buckle anchoring devices in which a belt buckle is fastened to an anchoring point via an elastic connecting strap—usually belt webbing—are used to permit high flexibility of connection. The belt webbing is usually fastened via a first loop to the belt buckle and via a second loop to a retaining bracket affixed to the vehicle. The length of the connecting strap between the two loops specifies the maximum distance between the anchoring point and the position of use of the belt buckle. This distance is intended to be as short as possible for particular applications. Such specification cannot be easily realized, however, as in the case of very short belt webbing the stitching process for forming the loops is very difficult or is no longer feasible at all.

In order to solve this problem DE 10 2009 010 781 A1, which illustrates a generic device for anchoring a belt buckle, suggests retaining the connecting strap in clamping connection between the legs of a clamping bracket U-shaped in cross-section on the vehicle body. The clamping bracket is fastened to the vehicle body by a screw penetrating the two leg ends. The connecting strap is fixed by clamping. In addition, the screwed connection can extend through the connecting strap, wherein also in this case the connecting strap is fixed by clamping. By the clamping of the connecting strap between the legs of the clamping bracket the second loop of the connecting strap and the strap portion required for stitching the connecting strap ends can be dispensed with. In the case of tensile load of the belt buckle the tensile forces are transmitted via the clamping into the clamping bracket and via the screw into the vehicle body.

SUMMARY OF THE INVENTION

It is the object of the invention to enable safe anchoring of a belt buckle using a connecting strap, wherein the anchoring permits a short distance between the anchoring point and the belt buckle.

The device according to the invention for anchoring a belt buckle comprises a fitting having a first end portion and a second end portion as well as a central portion provided between the two end portions. The central portion includes an opening for fastening the fittings in a way affixed to the vehicle by means of a screw. The device further comprises a connecting strap which is connected on the one hand to the belt buckle and on the other hand to the fitting. In accordance with the invention, the connecting strap extends along the first end portion and the central portion of the fitting and is threaded via a loop into an eyelet of the second end portion.

In the device according to the invention the connecting strap has a length sufficient to carry out all required or desired stitching operations, as it extends from the belt buckle beyond the first end portion and the central portion to the distant second end portion of the fitting. The opening in the central portion of the fitting marks the anchoring point of the device. In contrast to the state of the art, the force-locked connection of the connecting strap to the fitting is made neither on the side of the fitting facing the belt buckle nor on the anchoring point but on the side of the fitting distant from the belt buckle, more exactly speaking at the second end portion where the connecting strap is threaded into the fitting eyelet. This displacement of the connecting point enables the portion of the connecting strap crucial to the distance of the belt buckle from the anchoring point, i.e. the portion reaching from the belt buckle to the opening of the central portion, to be kept extremely short when the fitting is appropriately designed.

An advantage of the device according to the invention relevant to the safety of the anchoring vis-à-vis the state of the art consists in the fact that in the case of tensile stress of the belt buckle the tensile forces can be safely introduced to the fitting via the loop connection—without the risk of slipping through—.

For guiding the connecting strap in a gentle way with respect to wear of the connecting strap a design of the fitting is of advantage in which at least one of the end portions is bent relative to the central portion, wherein preferably both end portions are bent to the same direction. Then the connecting strap does not experience an abrupt change of direction about a large angle at an end edge of the fitting but a "gentle" kink-free deflection via the bent end portion(s).

A preferred embodiment of the device according to the invention provides that the connecting strap includes a hole at a strap portion extending beneath the central portion through which hole the screw penetrates the connecting strap in the mounted state of the device. This design permits to guide the connecting strap directly over the anchoring point. Thus at this point the connecting strap can be optimally forced with the fitting against the vehicle body (or against the fitting of a further anchoring device arranged there beneath). Via the clamping connection obtained in this way additional tensile forces can be introduced to the vehicle body.

The connecting strap preferably can have at least partly a double-layer configuration so as to permit simple loop formation and to achieve higher tensile strength.

In order to avoid during assembly of the device that the double-layer connecting strap gets caught by any protruding parts, the invention optionally provides that the layers of the connecting strap are stitched together in portions. Especially the layers of a strap portion being adjacent to the second loop can be stitched to each other.

Equally, the layers of another strap portion being adjacent to another loop of the connecting strap can be stitched to each other, which loop is threaded into an eyelet of the belt buckle to connect the belt buckle to the connecting strap.

Also the layers of a strap portion extending beneath the central portion can be stitched to each other.

In general, the special design of the anchoring device according to the invention offers the possibility of combining several of those devices. A device arrangement comprising at least two devices in which the fittings of the two devices are superimposed so that the openings of the central portions are overlapping enables several belt buckles to be anchored to the same anchoring point by only one screw. This is relevant in particular to the back seat area of a vehicle where double buckles are provided for an outer seat and a central seat.

In a preferred embodiment of the device arrangement it is provided that the two devices have different orientations, the devices being preferably disposed so that the first end portion of the one device is opposed to the second end portion of the other device and vice versa. In this way a respective parallel orientation of the two belt buckles is predetermined.

BRIEF DESCRIPTION OF THE DRAWINGS

Further features and advantage of the invention are resulting from the following description and from the enclosed drawings which are referred to. The drawings show in FIG. 1 a perspective view of two devices for anchoring a belt buckle according to the invention.

DESCRIPTION OF EMBODIMENTS

Figure 2:
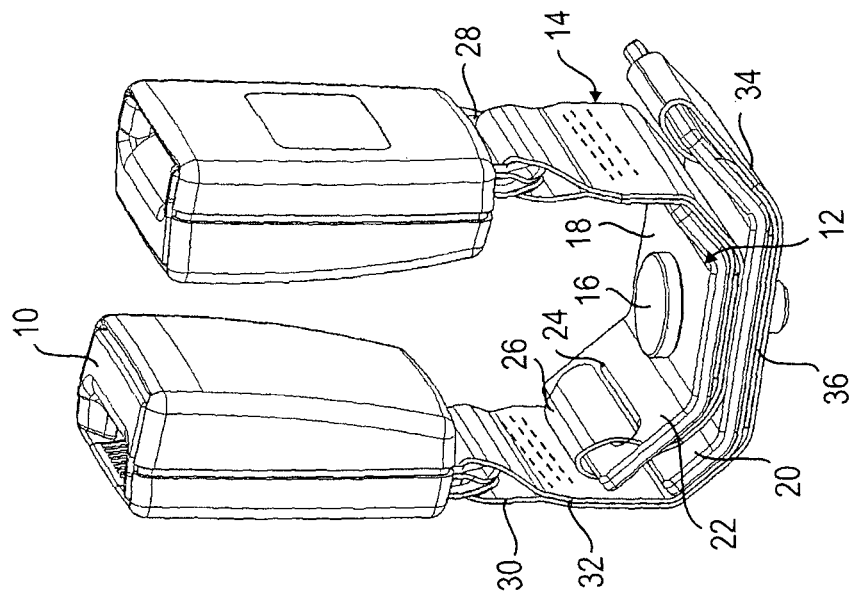
FIG. 2 a perspective view of the devices slightly rotated vis-à-vis FIG. 1.
Figure 1:
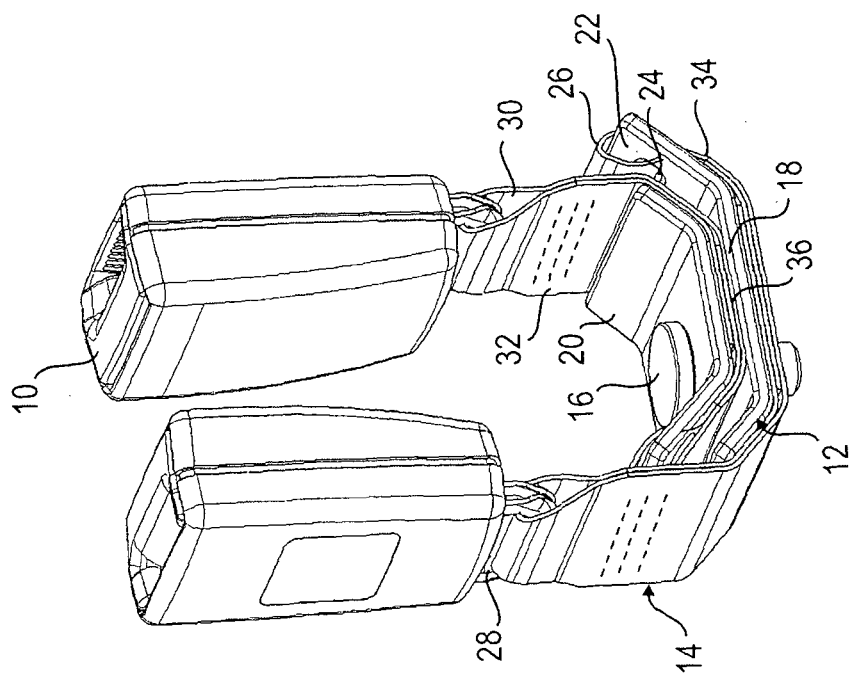

In the FIGS. 1 and 2 a combination of two anchoring devices is illustrated by which two belt buckles 10 can be anchored in a way affixed to the vehicle. The two devices have a substantially identical structure and exhibit substantially the same dimensions. As substantial components each device comprises a fitting 12 and a connecting strap 14 in the form of a belt webbing as it is also used for seat belts. The fittings 12 of the two devices are mounted by a joint screw 16.

Each fitting 12 has a single-layer design and starting from a flat central portion 18 includes—related to the mounted state of the device—an upward bent first end portion 20 and an opposite equally upward bent second end portion 22 which is somewhat longer compared to the first end portion 20. In the central portion 18 an opening for the screw 16 is formed which defines the anchoring point of the device. In the second end portion 22 a fitting eyelet 24 is formed.

The connecting strap 14 in the shown embodiment has a double-layer design over its entire length, which is not mandatory, however. A first loop 30 of the connecting strap 14 threaded into a belt buckle eyelet 28 makes the connection to the belt buckle 10. A second loop 26 formed at the opposite end of the connecting strap 14 is threaded into the fitting eyelet 24 and thus makes the connection to the fitting 12.

In the mounted state of the device the connecting strap 12 extends from the belt buckle 10 beneath the fitting 12 along the first end portion 20 and the central portion 18 to the fitting eyelet 24 and thus largely follows the contour of the fitting 12. At the location where the central portion 18 includes the opening for the screw 16 also the connecting strap 14 exhibits a hole whose rim is stitched for reinforcement. The screw 16 thus penetrates both the central portion 18 and the connecting strap 14.

Optionally, the layers of a first strap portion 32 being adjacent to the first loop 30 and/or the layers of a second strap portion 34 being adjacent to the second loop 26 and/or the layers of the interposed central strap portion 36 extending beneath the central portion 18 can be stitched to each other.

In the combination of two devices shown in FIGS. 1 and 2 the devices are superimposed with opposite orientation, i.e. the first end portion 20 of the one device is opposed to the second end portion 22 of the other device and vice versa. Thus the two belt buckles 10 are arranged on opposite sides of the central portion 18.

By the screw 16 the two superimposed fittings 12 are mounted in a way affixed to the vehicle so that the central strap portion 36 of the one device is clamped between the fitting 12 thereof and the vehicle body and the central strap portion 36 of the other device is clamped between the two fittings 12.

With a tensile force transmitted from the belt buckle 10 via the belt buckle eyelet 28 to the connecting strap 14 the force is introduced to the fitting 12 mainly via the loop connection at the distant second end portion 22 of the fitting 12. The force is then introduced from the fitting 12 via the screwed connection into the vehicle body.

The distance between the anchoring point defined by the screwed connection and the upper edge of the belt buckle 10 amounts to less than 140 mm.

As a matter of course, also a single-buckle design with only one device is possible.

LIST OF REFERENCE NUMERALS 10 belt buckle
12 fitting
14 connecting strap
16 screw
18 central portion
20 first end portion
22 second end portion
24 fitting eyelet
26 second loop
28 belt buckle eyelet
30 first loop
32 first strap portion
34 second strap portion
36 third strap portion

The invention claimed is:

1. A device for anchoring a belt buckle, comprising:
    a fitting (12) including a first end portion (20) and a second end portion (22) as well as a central portion (18) provided between the two end portions (20, 22), the central portion (18) having an opening for fastening the fitting (12) in a way affixed to a vehicle by means of a screw (16), and
    a connecting strap (14) which is connected to the belt buckle (10) and to the fitting (12),
    wherein the connecting strap (14) extends along the first end portion (20) and the central portion (18) of the fitting (12) and is threaded into an eyelet (24) of the second end portion (22) via a loop (26).

2. The device according to claim 1, wherein at least one of the end portions (20, 22) is bent relative to the central portion (18).

3. The device according to claim 1, wherein at a strap portion (36) extending beneath the central portion (18) the connecting strap (14) exhibits a hole through which the screw (16) penetrates the connecting strap (14) in the mounted state of the device.

4. The device according to claim 1, wherein the connecting strap (14) has at least partly a double-layer configuration.

5. The device according to claim 4, wherein layers of a strap portion (34) of the connecting strap being adjacent to the loop (26) are stitched to each other.

6. The device according to claim 4, wherein another loop (30) of the connecting strap (14) is threaded into an eyelet (28) of the belt buckle (10) and layers of a strap portion (32) of the connecting strap being adjacent to the other loop (30) are stitched to each other.

7. The device according to claim 4, wherein layers of a strap portion (36) of the connecting strap extending beneath the central portion (18) are stitched to each other.

8. A device arrangement comprising at least two devices according to claim 1, wherein the fittings (12) of the two devices are superimposed so that the openings of the central portions (18) are overlapping.

9. The device arrangement according to claim 8, wherein the two devices have different orientations, the devices preferably being arranged so that the first end portion (20) of the one device is opposed to the second end portion (22) of the other device and vice versa.

10. The device according to claim 1, wherein both of the end portions are bent to the same direction relative to the central portion.

\* \* \* \* \*